Dec. 4, 1923.
L. L. SALFISBERG
1,476,224
APPARATUS FOR FEEDING ARTICLES
Filed Feb. 24, 1922
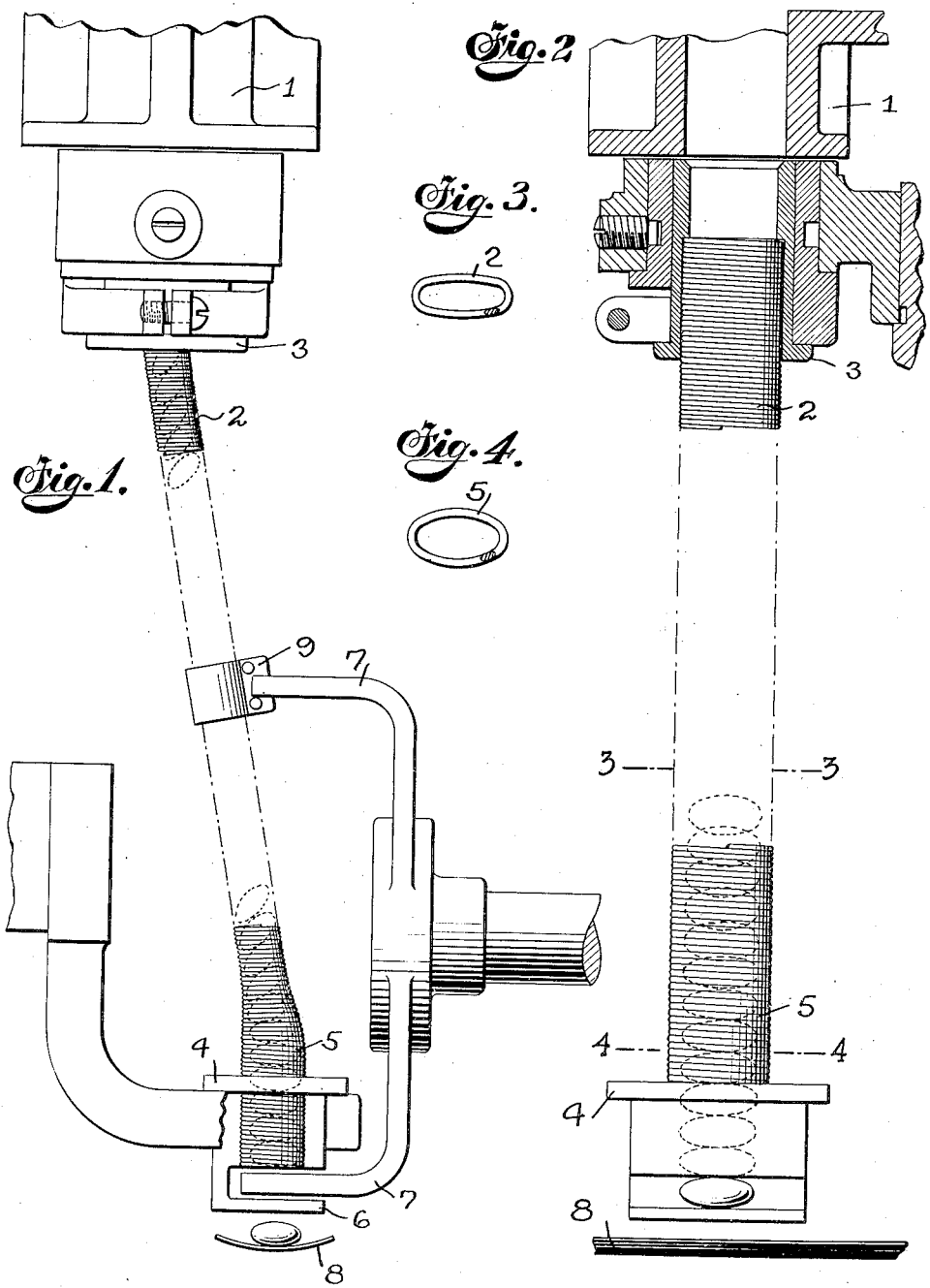

Patented Dec. 4, 1923.

1,476,224

UNITED STATES PATENT OFFICE.

LEROY L. SALFISBERG, OF NEWARK, NEW JERSEY, ASSIGNOR TO IVERS-LEE COMPANY, OF NEWARK, NEW JERSEY, A CORPORATION OF DELAWARE.

APPARATUS FOR FEEDING ARTICLES.

Application filed February 24, 1922. Serial No. 539,046.

*To all whom it may concern:*

Be it known that I, LEROY L. SALFISBERG, a citizen of the United States, and a resident of Newark, county of Essex, State of New Jersey, have invented an Improvement in Apparatus for Feeding Articles, of which the following is a specification.

The present invention relates to an improvement in methods of and apparatus for feeding articles, one object being to feed said articles successively and present them in a uniform predetermined position. Apparatus for this purpose is more particularly adapted for use in connection with packaging machines of the type in which article carrying packages in strip form are made with the articles evenly spaced apart and with corresponding dimensions of the articles uniformly positioned with respect to the strip carrier. It is also contemplated that my improved method and the article feeding mechanism embodying my invention may be utilized in the making of other forms of packages or for the purpose of counting or segregating articles according to a predetermined order or arrangement.

Considerable difficulty has heretofore been encountered in presenting at a given point and at a suitably high rate of speed, a succession of articles in a uniform predetermined position, particularly where such articles are withdrawn from a hopper where they have been placed casually and without regard to their individual or relative positions. So far as I am aware, no single type of mechanism thus far available will effectively withdraw all shapes of articles casually supported in a container as described and present such articles at a predetermined point in a uniform predetermined position on a commerical scale. Thus, apparatus which is adapted to effectively handle spherical shaped bodies will not necessarily be as effective in connection with the feeding of cubes. Moreover, great difficulties are encountered in handling articles of relatively irregular shape or those which have one dimension substantially greater than any other dimension or, where the outer surface of the article is of such contour that its dimensions vary in all directions, such for example, as an ellipsoidal article.

One embodiment of my invention and of apparatus suitable for the practice of my improved method is illustrated in the drawings accompanying the present specification, and in which—

Figure 1 is an end view,

Figure 2, a front view.

Figure 3, a section on the line 3—3 of Figure 2, and

Figure 4, a section on the line 4—4 of Figure 2.

Referring to the drawings, the articles to be fed are casually supported in a hopper or container 1 preferably of the type illustrated and described in my copending application Serial Number 383,817, filed May 24, 1920, and which is rotated or otherwise actuated to discharge the articles uniformly and successively into the receiving end of a conduit 2 which is preferably elastic and held under tension between terminal members 3 and 4. It has been found in practice that a coiled wire spring of suitable dimension and cross sectional contour constitutes an effective conduit for the purpose in view. Thus, for articles of a given size and shape, the receiving end of the conduit 2 will have one dimension slightly less than the corresponding dimension of the article to be fed, so that, in order to pass through the conduit, the article will assume an angular position with respect to the longitudinal axis of the conduit. At the discharge end thereof, it is contemplated that the opening will be sufficient to allow the article to pass freely and with its major sectional plane substantially normal to the axis of the conduit, and between the receiving end and the discharge end there is a tapered portion 5 gradually increasing as to one dimension of its opening to permit repositioning of the article therein or, in other words, to permit the article to move from a relatively inclined position with respect to the longitudinal axis of the conduit to a position in which its major sectional plane will be substantially normal to said axis.

An article receiving platform or support 6, for purposes of a packaging machine of the continuous strip package forming type, is positioned adjacent to the discharge end of the conduit and arranged to expose an article lying or supported thereon in the path of an article displacing member or picker having article engaging or displacing arms 7 which are rotated by any suitable means. As the arms 7 are operated, they will successively strike the articles in position on the support 6 and dislodge the same therefrom to a position on a traveling strip 8, if desired, and, if the rotation of the arms 7 is uniform, each arm will engage and displace an article at each rotation and the articles will be spaced a substantially uniform distance apart, occupying the strip 8 substantially uniform positions with respect thereto. I have also provided means for periodically agitating or deforming said conduit, thus imparting thereto a vibratory motion which prevents choking or wedging of the articles in the elastic conduit, thus inducing a steady flow of articles to the discharge end. Where the picker mechanism is of the type illustrated, it may be desirable to have the conduit arranged at an angle, as indicated in Figure 1, and to secure to the conduit a projecting member 9 which extends into the path of the picker arms 7 and is engaged and deflected thereby in the course of their rotation.

My invention further involves a method of feeding articles which is independent of the particular mechanism hereinabove described but which can be practiced in connection with the use and operation thereof. Thus, the first step is to arrange the articles in such a manner that one will be in the required predetermined position and will support, either directly or indirectly other articles to be fed in succession but with their major sectional planes disposed at an angle to the major sectional plane of the first mentioned article. Then, by displacing said first mentioned article and others successively as they reach the predetermined position, the articles supported by the article in the initial position will successively move from their inclined positions to the position of the first mentioned article, all in a continuous operation.

I claim as my invention.

1. Apparatus for feeding ellipsoidal articles successively in a uniform predetermined position comprising an article guiding conduit of elliptical cross-sectional contour and presenting an opening at the discharge end great enough to pass the article with its major elliptical plane normal to the longitudinal axis of the passageway and an opening at the receiving end small enough to pass the article only with its major elliptical plane inclined with respect to the longitudinal axis of the passageway.

2. Apparatus for feeding articles successively and in a uniform predetermined position comprising an article guiding conduit presenting an opening of elliptical cross sectional contour and of increasing dimension along its minor axis toward the discharge end.

3. Apparatus for feeding articles successively and in a uniform predetermined position comprising an article guiding conduit presenting an opening of elliptical cross sectional contour and of increasing dimension along its minor axis toward the discharge end, and means for receiving an article from said discharge end.

4. Apparatus for feeding articles successively and in a uniform predetermined position comprising an article guiding conduit presenting an opening of elliptical cross sectional contour and of increasing dimension along its minor axis toward the discharge end, article displacing means, and supporting means arranged in article receiving relation to the discharge end to expose said article in the path of said article displacing means.

5. Apparatus for feeding articles successively and in a uniform predetermined position comprising an article guiding conduit having an opening increasing in magnitude along one axis toward its discharge end to discharge an article freely therefrom with its major sectional plane normal to the longitudinal axis of the conduit, and means for agitating said conduit to prevent or overcome clogging of articles therein.

6. Apparatus for feeding articles successively and in a uniform predetermined position comprising an article guiding conduit having an opening increasing in magnitude along one axis toward its discharge end to discharge an article freely therefrom with its major sectional plane normal to the longitudinal axis of the conduit, and means for engaging the conduit intermediate its ends to prevent or overcome jamming of articles therein.

7. Apparatus for feeding articles successively and in a uniform predetermined position comprising an article guiding conduit having an opening increasing in magnitude along one axis toward its discharge end to discharge an article freely therefrom with its major sectional plane normal to the longitudinal axis of the conduit, and conduit oscillating means including an arm projecting from said conduit and movable means for periodically engaging said arm to deform and deflect the conduit.

8. Apparatus for feeding articles successively and in a uniform predetermined position comprising an article guiding conduit having an opening increasing in magnitude along one axis toward its discharge end to discharge an article freely therefrom with its major sectional plane normal to the longitudinal axis of the conduit, and means for displacing articles successively from a position adjacent the discharge end of the conduit including a rotatable arm adapted to displace the articles and to periodically deform the conduit.

9. An article guiding conduit consisting of a coiled spring having an opening increasing in magnitude along one axis toward the discharge end.

In testimony whereof, I have signed my name to this specification this 16th day of February, 1922.

LEROY L. SALFISBERG.